United States Patent [19]

Morrel-Samuels

[11] Patent Number: 5,795,155
[45] Date of Patent: Aug. 18, 1998

[54] LEADERSHIP ASSESSMENT TOOL AND METHOD

[75] Inventor: Palmer Morrel-Samuels, Sylvan, Mich.

[73] Assignee: Electronic Data Systems Corporation, Plano, Tex.

[21] Appl. No.: 625,969

[22] Filed: Apr. 1, 1996

[51] Int. Cl.$^6$ .................. G09B 19/18; G09B 19/00; G09B 3/00; G09B 7/00
[52] U.S. Cl. .................. 434/107; 434/219; 434/236; 434/322; 434/323; 434/362
[58] Field of Search .................. 434/107, 109, 434/219, 236, 238, 307 R, 413, 416, 430, 433, 322, 323, 362, 363; 273/292, 299, 300, 302

[56] References Cited

U.S. PATENT DOCUMENTS

| | | | |
|---|---|---|---|
| 1,419,809 | 6/1922 | Bowles | 434/107 |
| 3,716,928 | 2/1973 | Meyer | 434/430 |
| 4,671,772 | 6/1987 | Slade et al. | 434/219 |
| 4,773,011 | 9/1988 | VanHoose | 364/424 |
| 4,937,439 | 6/1990 | Wanninger et al. | 235/456 |
| 5,365,425 | 11/1994 | Torma et al. | 365/401 |
| 5,486,999 | 1/1996 | Mebane | 364/401 |

OTHER PUBLICATIONS

*Peer Review*, EDS Peer Review Publication, Copyright © 1993 Electronic Data Systems Corporation.
U.S. Patent Application Serial No. 08/129,802, filed Sep. 30, 1993, "Method and Apparatus for Collecting the Personal Perception(s) of an Individual Among Items on Any Topic of Interest.".

*Primary Examiner*—Robert A. Hafer
*Assistant Examiner*—John Edmund Rovnak
*Attorney, Agent, or Firm*—Robert W. Holland; L. Joy Griebenow

[57] ABSTRACT

Assessment tool (12) for measuring effectiveness of a target. The assessment tool (12) includes a first part (14) and second part (16). The first part (14) includes a plurality of independent objects (35) each displaying a statement (36) directed toward a characteristic of the target. The second part (16) includes at least one inquiry (52) directed toward the verifiable performance of the target.

20 Claims, 11 Drawing Sheets

FIG. 1A

| Section 1 | 1.01 | Section 1 | 1.05 | Section 1 | 1.09 |
|---|---|---|---|---|---|
| Faces the hard facts | | Gathers, evaluates and retains information effectively ~36 | | Reliably recognizes and appreciates the real and concrete | |

| Section 1 | 1.02 | Section 1 | 1.06 | Section 1 | 1.10 |
|---|---|---|---|---|---|
| Keeps track of the bottom line ~36 | | Knows how own behaviors and attitudes are perceived by others | | Takes care of own physical health | |

| Section 1 | 1.03 | Section 1 | 1.07 | Section 1 | 1.11 |
|---|---|---|---|---|---|
| Manages details skillfully | | Works with a style that is intensely pragmatic ~36 | | Exemplifies what it means to be a realistic leader | |

| Section 1 | 1.04 | Section 1 | 1.08 |
|---|---|---|---|
| Keeps information organized even in difficult circumstances | | Takes action that is cold and tough when circumstances require it | |

(labels: 34, 35, 36, 18, 20, 14)

| Section 2        2.01 | Section 2        2.05 | Section 2        2.09 |
| --- | --- | --- |
| Shows intellectual brilliance ~36 | Thinks in terms of systems and history ~36 | Makes decisions based on a broad and deep view of life |

| Section 2        2.02 | Section 2        2.06 | Section 2        2.10 |
| --- | --- | --- |
| Demonstrates a consistent ability to think big ~36 | Sees subtle interconnections ~36 | Conducts business with an alert serenity |

| Section 2        2.03 | Section 2        2.07 | Section 2        2.11 |
| --- | --- | --- |
| Analyzes problems logically ~36 | Generates innovative ideas | Exemplifies what it means to be a visionary leader ~36 |

| Section 2        2.04 | Section 2        2.08 |
| --- | --- |
| Discusses abstract concepts with precision and clarity | Uses creative intuition |

FIG. 1B

| Section 3      3.01 | Section 3      3.05 | Section 3      3.09 |
|---|---|---|
| Shows genuine care for others ~36 | Shows consistent commitment to teamwork ~36 | Demonstrates unimpeachable integrity regardless of circumstances |

| Section 3      3.02 | Section 3      3.06 | Section 3      3.10 |
|---|---|---|
| Delivers great customer service | Encourages a real sense of community among colleagues | Makes promises wisely and keeps them faithfully ~36 |

| Section 3      3.03 | Section 3      3.07 | Section 3      3.11 |
|---|---|---|
| Derives joy from work ~36 | Tempers decisions with a kind and considerate understanding | Exemplifies what it means to be an ethical leader |

| Section 3      3.04 | Section 3      3.08 |
|---|---|
| Seizes work as an opportunity for greatness ~36 | Conducts business in a manner that is universally seen as trustworthy |

FIG. 1C

| Section 4 | 4.01 |
|---|---|
| Uses power courageously 36 | |

| Section 4 | 4.05 |
|---|---|
| Takes effective care of own emotional health and well-being | |

| Section 4 | 4.09 |
|---|---|
| Shows deep appreciation for the meaning of human freedom | |

| Section 4 | 4.02 |
|---|---|
| Takes the initiative to act 36 | |

| Section 4 | 4.06 |
|---|---|
| Conducts business as a responsible and fully accountable entrepreneur | |

| Section 4 | 4.10 |
|---|---|
| Works with a deeply rooted and well-centered maturity | |

| Section 4 | 4.03 |
|---|---|
| Is respected for formulating strong and thoughtful arguments | |

| Section 4 | 4.07 |
|---|---|
| Accepts anxiety with grace and comes to terms with guilt | |

| Section 4 | 4.11 |
|---|---|
| Exemplifies what it means to be a courageous leader 36 | |

| Section 4 | 4.04 |
|---|---|
| Presents an authentic and clearly delineated personal image | |

| Section 4 | 4.08 |
|---|---|
| Learns and benefits from painful mistakes 36 | |

| Section 6 | 6.01 | Focuses full attention on being present, available, and attentive |
| Section 6 | 6.02 | Transforms ordinary discourse into an engaging and interesting exchange |
| Section 6 | 6.03 | Builds safe interpersonal relationships based on emotional maturity |
| Section 6 | 6.04 | Establishes strong personal connections with people |
| Section 6 | 6.05 | Manages time effectively |
| Section 6 | 6.06 | Maintains a firm grip on the present without neglecting the past or future |
| Section 6 | 6.07 | Takes full accountability for the personal role played in shaping the world |
| Section 6 | 6.08 | Moves effectively from criticism into action |
| Section 6 | 6.09 | Exemplifies what it means to be an emotionally mature leader |

FIG. 1G

| Section 7 | 7.01 |
|---|---|
| Reflects on living and acting without neglecting living and acting | |

| Section 7 | 7.02 |
|---|---|
| Demonstrates an ability to rise above the emotional currents of the moment ~36 | |

| Section 7 | 7.03 |
|---|---|
| Derives practical benefit from the study of consciousness ~36 | |

| Section 7 | 7.04 |
|---|---|
| Shows an awareness of how the mind organizes beliefs, things and worlds ~36 | |

| Section 7 | 7.05 |
|---|---|
| Takes responsibility for defining and maintaining the sense of self | |

| Section 7 | 7.06 |
|---|---|
| Exerts the inner strength needed to overcome inertia and institute personal change ~36 | |

| Section 7 | 7.07 |
|---|---|
| Recognizes the place of evil in the world and comes to terms with it | |

| Section 7 | 7.08 |
|---|---|
| Shows appreciation for the mystery and miracle of being | |

| Section 7 | 7.09 |
|---|---|
| Exemplifies what it means to be a teaching leader ~36 | |

Please hand in as soon as finished.

DEMOGRAPHICS 50

51 {
1) Male / Female   (Please circle one)
2) On your next anniversary, how many years will you have been with the company?
3) Please list the name of your unit.

52 {
4) How many sections were there in the test you just completed, excluding these questions?
5) How many items were there in the test you just completed, excluding these questions?
6) How many minutes did you take to complete the test, excluding these questions?
7) What do you think was your average rating, excluding the items in the middle pile?

16

LEADERSHIP ASSESSMENT TOOL AND METHOD

TECHNICAL FIELD OF THE INVENTION

This present invention relates generally to a method and system for measuring effectiveness of a manager, and more particularly to a leadership assessment tool and method.

BACKGROUND OF THE INVENTION

Competent management is generally recognized as essential to the success of a business. To obtain competent management, businesses often employ performance appraisals as an integral part of management training and promotion programs. Typically, an appraisal comprises a questionnaire or other type of survey device for eliciting responses from the manager to be evaluated and from selected co-workers. The survey may include a series of questions designed to obtain responses suitable for developing data respecting the strength or weakness of the manager, in relation to management duties, and how the performance of the manager is perceived by others. Frequently, the response data is compiled for review by the manager as a feedback device, upon which to base corrective action, or otherwise inspire improvement.

Existing evaluation tools, however, are largely ineffective because they often yield results that are unreliable in that they are not capable of reproduction and that are invalid and that they are inaccurate. This is particularly problematic because federal law now requires that any evaluation having an impact on employee promotion, demotion, assignment, training or job responsibilities, be able to prove its validity and reliability. Accordingly, there exists a need in the art for an improved leadership assessment tool and method.

SUMMARY OF THE INVENTION

In accordance with the present invention, a leadership assessment tool and method is provided that substantially eliminates or reduces the disadvantages and problems associated with prior evaluation tools.

In accordance with the present invention, an assessment tool for measuring leadership effectiveness is provided. The assessment tool comprises a first part and a second part. The first part includes a plurality of independent objects. Each object displays a statement directed toward a characteristic of a target manager. The second part includes at least one inquiry directed toward verifiable performance of the target.

More specifically, the assessment tool may include a response scale for rating each statement. The response scale may include an upper poll assigned to a most favorable characteristic of the target and a lower poll assigned to a least favorable characteristic of the target. The upper poll may be the numeral 10 and the lower poll may be the numeral negative 10. Additionally, the response scale may include a number of intermediate polls assigned to the remaining characteristics of the target. The response scale may also include a neutral option.

The first part of the assessment tool may include a plurality of sections directed toward different domains. Each section includes at least one object displaying a statement directed toward a characteristic of the target that is relevant to the domain. A statement summarizing the characteristics of the target relevant to the domain may also be provided for each section.

In accordance with one embodiment, the independent objects of the first part of the assessment tool may be cards that can be easily handled, seen in perspective, and ordered by the target. In this embodiment, each card may comprise an element identifying the section to which it belongs. Additionally, each card may include a sequence element identifying the sequence of the card in its section. The element and a sequence element may each comprise a numeral.

Important technical advantages of the present invention include an improved leadership assessment tool and method. In particular, the invention provides an assessment tool having good reliability in that its results are capable of reproduction and having good validity in that its results are accurate.

Another important technical advantage of the present invention includes providing an assessment tool that uses independent objects to display statements directed toward characteristics of the target. This provides a target with perspective and allows the strength and weaknesses to be viewed as a set. Moreover, the independentness of the objects prevents the responses from being affected by the order in which the statements are displayed on a page.

Still another technical advantage of the present invention is that it is gender-neutral and includes the ability to evaluate a manager without introducing bias that could unfairly discriminate against a group.

Other technical advantages are readily apparent to one skilled in the art from the following figures, description, and claims.

BRIEF DESCRIPTION OF THE DRAWINGS

For a more complete understanding of the present invention, and the advantages thereof, reference is now made to the following description taken in conjunction with the accompanying drawings, in which.

DETAILED DESCRIPTION OF THE INVENTION

Figure 1:
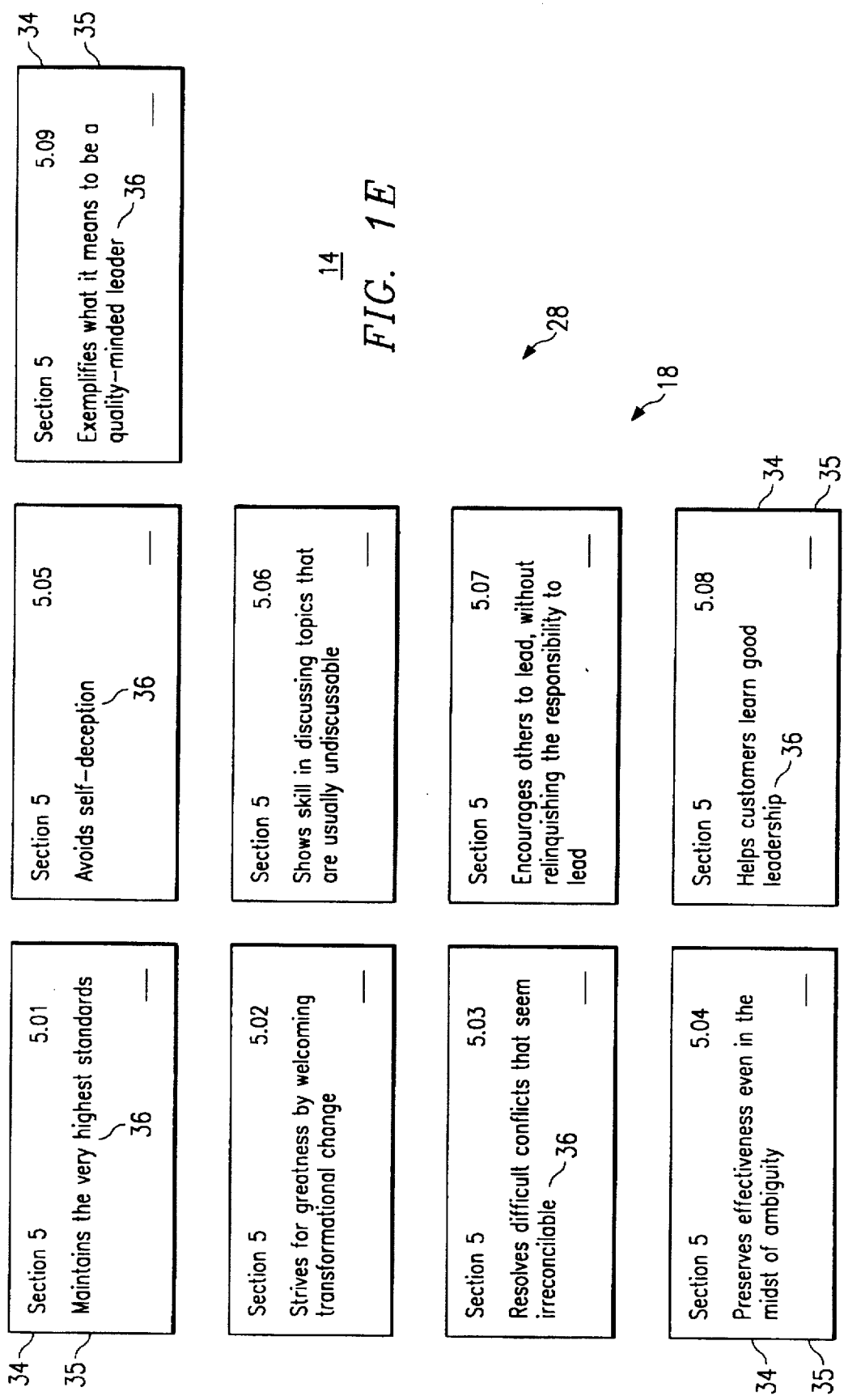
FIGS. 1A–H are face views illustrating an assessment tool for measuring leadership effectiveness of a target manager in accordance with the present invention.

The preferred embodiments of the present invention and its advantages are best understood by referring to FIGS. 1–4 of the drawings, in which like numerals refer to like parts throughout the several views. FIGS. 1A–H show an assessment tool 12 for measuring effectiveness of a target manager. The assessment tool 12 may be used either as a self-development tool, a staff selection tool, or a combination of both. Those skilled in the art will understand that the assessment tool may also be used to measure the effectiveness of persons in other positions.

The assessment tool 12 comprises a first part 14 and a second part 16. The first part 14 is shown by FIGS. 1A–G. The first part 14 may include a plurality of sections 18 directed toward different behavioral domains. In one embodiment, the first part 14 preferably includes sections 18 directed toward the behavioral domains of being realistic 20, being visionary 22, being ethical 24, being courageous 26, being quality-minded 28, being emotionally mature 30, and being a teacher 32. These behavioral domains are in accordance with Dr. peter Koestenbaum's model of leadership. Further information regarding Dr. Koestenbaum's model of leadership may be obtained from Dr. Koestenbaum's book, *Leadership: The Inner Side of Greatness*, San Francisco, Jossey-Bass, 1991.

The realistic section 20 is directed toward a manager's ability to be realistic, pragmatic, and objective. The visionary section 22 is directed toward behaviors exhibited by visionary leaders. These includes intelligence about business and an ability to maintain perspective. The ethical section 24 is directed toward a manager's actions in being considerate, committed, and trustworthy. The courageous section 26 is directed toward the manager's ability to learn and benefit from painful mistakes, to take the initiative, and to accommodate the opinions of others. The quality-minded section 28 is directed toward a manager's action in maintaining the highest standards and striving for greatness. The emotional maturity section 30 is directed toward the ability to establish strong personal connections with people, to manage time effectively, and to give his or her full attention to being present, available and attentive. The teacher's section 32 is directed toward a manager's broadmindedness about living and an inner strength needed to overcome, nurture and institute personal change.

In the embodiment of the illustrated example, the realistic, visionary, ethical and courageous sections together comprise the main behavioral domains. In this embodiment, the quality minded, emotionally mature and teacher domains form sub domains.

Those skilled in the art will understand that the first part 14 of the assessment tool 12 may include all or only some of the above listed behavioral domains, as well as other behavioral domains. Thus, the assessment tool may be adapted to the specific behavioral domains that are important to a particular business or endeavor. Moreover, completely different behavioral domains may be used to measure the effectiveness of a person in another position.

Each section 18 may include a plurality of independent objects 35. As used herein, the phrase "independent object" means an object that can be moved in relation to other objects. As shown by FIGS. 1A–G, the independent objects 35 may be cards 34 that can be easily moved, viewed in perspective, and ordered. Those skilled in the art, however, will understand that the independent objects 35 may be any other type of item that can be independently moved. For example, the independent objects 35 may be electronic images on a display, such as a television, other type of cathode ray tube (CRT), liquid crystal display (LCD), or the like. In such a case, the electronic images may be ordered by separately moving them around on the display.

Sections 18 directed toward main domains may include more independent objects 35 than sections 18 directed toward sub domains. For example, as shown in FIGS. 1A–G, the realistic section 20, visionary section 22, ethical section 24, and courageous section 26 each include eleven independent objects 35. Conversely, the quality minded section 28, emotionally mature section 30, and teacher section 32 each include only nine independent objects 35. It will be understood by those skilled in the art, however, that sections directed toward the above discussed or other domains may include a greater or lesser number of objects per domain, as desired.

Each independent object 35 may display one or more statements 36 directed toward a characteristic of the target manager. Statements 36 are preferred to questions because statements are easier for respondents to conceptualize. Typically, a respondent will read a statement, think of an example of the characteristic to which the statement is directed, and then compare the target, which may be themselves, with that example.

The statements 36 may be of approximate equal length and each generally arranged on only one or two lines. Thus, the statements 36 are preferably short, crisp, and direct. As a result, respondents will understand at a glance that the assessment tool 12 is not unreasonably long and will not rush to finish. Accordingly, better results are obtained by the compact and simple format of assessment tool 12.

A response scale may be provided for rating the different characteristics of the target manager. The response scale may include an upper poll assigned to a most favorable characteristic of the target and a lower poll assigned to a least favorable characteristic of the target. The upper poll may be a numeral 10 and the lower poll may be the number negative 10. These numbers are preferred for the response scale because they may be readily converted to percentage in a respondent's mind. However, those skilled in the art will understand that other numbers may be used and yet remain within the scope of the present invention.

The response scale may also include a number of intermediate options assigned to the remaining characteristics of the target. Additionally, the response scale may include a neutral option. The neutral option may be achieved by employing a scale having an odd number of selections such that the middle selection is neutral. Here, the numeral (0) halfway between negative ten and ten, is neutral. Thus, the target manager may be rated as neutral for some of the statements, which is neither good nor bad.

The assessment tool 12 may include a number of validation measures. Each independent object 35 may include an element 40 identifying the section 18 to which the object belongs. The element 40 informs a respondent that a series of objects 35 are directed toward the same domain and thereby increases reliability within a section 18, preferably, however, the element 40 does not name the domain. Thus, the respondent is not aware of the behavioral domain to which a section 18 is directed, only that certain objects 35 are part of the same section 18 and are thus likely to be directed toward a single domain. Additionally, each object 35 may also include a sequence element 42 identifying the sequence of objects 35 in a section 18. For example, as shown in FIG. 1A, the first object 35, or card 34, of section 1 is numbered 1.01, the second card 34 of the first section number 1.02, the third card of the first section numbered 1.03, etc.

A summary statement 45 may be used at the end of each section 18 to provide a direct method of testing reliability. The summary statement 45 summarizes the behavioral domain of the section 18. Reliability of the statements 36 of a section 18 is shown by good correlation between a response to the summary statement 45 and an average response to the other statements 36 in that section 18.

The second part 16 of the assessment tool 12 may be a validation section 50. The validation section 50 may include at least one inquiry 52 directed toward verifiable performance of the target manager. In one embodiment, as shown in FIG. 1H, the second part 16 may include demographic questions 51 concerning the respondent.

The second part 16 may also include one or more inquiries 52 directed toward immediate verifiable performance of the target. For example, the performance of the target in completing the first part 14 of the assessment tool 12 may be verified. Accordingly, the accuracy of a response, and thus a respondent, may be determined from the validation section 50. The validation section 50 and the summary statement 45 of each section 18 provide the assessment tool 12 with the reliability and validity required by federal law for any assessment having impact on employee promotion, demotion, assignment, training, or job responsibilities.

The assessment tool 12 may be used as a self-evaluation. In such case, the target manager is asked to separate the cards 34 into three stacks, weak, neutral or strong. The target manager may then select the card 34 corresponding to the characteristic in which he or she is weakest and assign that card, or characteristic, a value of negative ten. Conversely, the target manager may select the card 34 corresponding to a characteristic in which he or she is strongest and assign that card, or characteristic, a value of ten. The neutral stack is ignored. The target manager may then rate each of the cards 34 from the weak stack using values from minus one to minus ten. The rating may be written directly onto the cards 34 in the space provided or tracked another way. The target manager may then rate the cards 34 from the strong stack using values from one to ten. Again, the ratings may be written directly onto the cards 34 in the space provided. Thereafter, as instructed by a final card 55 the target manager may hand in the cards 34 to complete the first part 14 of the assessment tool 12.

The target manager may then receive the second part 16 of the assessment tool 12. The target is asked to answer the demographic questions 51 and the validation inquiries 52. Upon completing the questions 51 and inquiries 52, the target manager may hand in the second part 16 to complete the assessment tool 12.

The results obtained from the assessment tool 12 may be kept confidential, only being released back to the target manager and to a reviewing supervisor. However, if desired, a top level management report may be released to top level management. At such a level, no specifics of any target manager are typically given. Instead, the report allows top level management to discern in which areas their managers generally excel and in which areas they generally do poorly. The report also allows top level management to discern variations over time. Thus, the report allows top level management to ascertain whether certain new programs introduced to increase leadership effectiveness are having the desired effect.

The assessment tool 12 may be presented in any suitable medium of expression. For example, as previously discussed, the independent objects 35 may be electronically displayed on a computer monitor or other type of CRT device. Further, as shown by FIGS. 1A-H, the assessment tool 12 may be displayed in printed format. In many applications, it will be desired to display the assessment tool 12 in printed form so that it can be used with minimal equipment, namely only a writing instrument.

Figure 2:
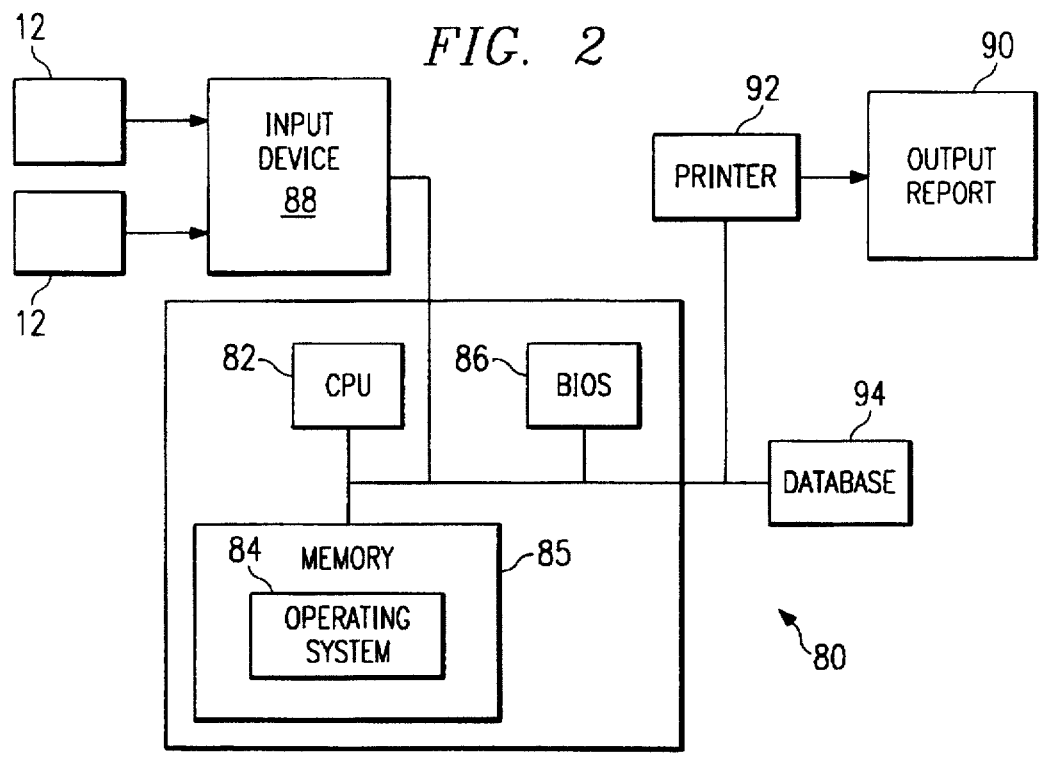
FIG. 2 is a schematic block diagram of a computer system for processing responses to the assessment tool of FIG. 1.

For the cards 34 shown in FIGS. 1A-G, the responses rating each statement 36 may be keyed into a computer. FIG. 2 shows a general purpose computer system 80 for receiving responses to the assessment tool 12 and manipulating the responses. The computer system 80 comprises a central processing unit (CPU) 82 that operates the computer system in conjunction with an operating system 84 to retrieve, process, store, and display data. The CPU 82 is typically implemented as a microprocessor such as that manufactured by Apple Computer or by Intel Corporation. The CPU 82 communicates control, address, and other signals with the operating system 84 and with the remaining components of the computer system 80 through a system bus. According to a specific embodiment of the present invention, the computer system 80 may be an Intel platform manufactured by Compaq Computer.

The operating system 84 comprises a set of computer programs that control the internal functions of the computer system 80, thereby allowing the computer system to run application software. The operating system 84 is typically installed in a mass storage device, such as a hard disk drive, a floppy disk drive, a CD, or a ROLM chip. During boot-up (initialization), the computer system 80 and the operating system 84 is loaded into system memory 85.

A basic input/output system (BIOS) driver 86 is stored in system memory 85 along with the operating system 84. The BIOS driver 86 supplies device-level control and support services for primary input/output devices of the computer 80 during the boot process. After a boot, the BIOS driver 86 accepts requests from application programs and from the operating system 84 running on the computer system 80 and performs input/output services as requested by those programs. The functions and operations of conventional BIOS drivers are well known and will not be further described.

On input device 88 for receiving responses to the first part 14 and the second part 16 of the assessment tool 12 may be provided. When the responses are in a computer-readable format, the input device 88 may be a scanner. If the responses are not in a computer-readable format, the input device may be a keyboard, mouse, touch screen, or similar device with which data can be keyed into a computer system 80. As described below in detail, the responses may be manipulated to generate an output report 90. A database 94 may be connected to the computer system 80 for use in connection with manipulating the responses. The output report 90 may be printed via a standard printer 92. Scanners, keyboards, databases, and printers are well known in the art and will not be further described.

The method of the present invention of assessing the effectiveness of a target will now be described. Although the method of the present invention is described in terms of measuring leadership effectiveness of a target manager, those skilled in the art will understand that the present invention encompasses measuring effectiveness of persons in other positions or persons with specific skills, expertise, or responsibilities.

Figure 3:
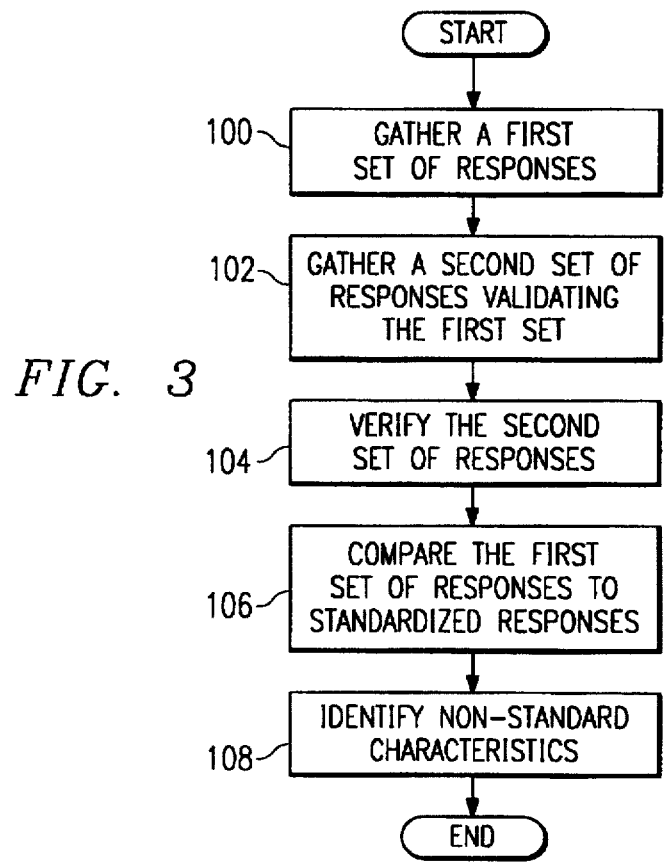
FIG. 3 is flow chart of a method of assessing leadership effectiveness in accordance with the present invention.

As shown in FIG. 3, the method begins at step 100 by gathering a first set of responses to the statements 36 of the first part 14 of the assessment tool 12. As above described, the responses may be in the range of a negative ten to ten response scale. The responses may be gathered in any media that is computer-readable or that can be translated into computer-readable media. For example, the responses may be gathered via computer input device such as a keyboard, mouse, touch screen, or the like.

Next, at step 102, a second set of responses corresponding to inquiries directed toward verifiable performance of the target may be gathered. The second set of responses may also be gathered in any media that is computer-readable or that can be translated into a computer-readable media. For example, the responses may be gathered via computer input device such as a keyboard, mouse, touch screen, or the like.

proceeding to step 104, the second set of responses may be verified. As previously discussed, the inquiries 52 directed toward verifiable performance may be directed toward performance of the target in completing the first part 14 of the assessment tool 12. As shown by FIG. 1H and previously discussed, such inquiries 52 may ask the respondent how many sections 18 and statements 36 there were in the first part 14, how many minutes did it take to complete the first part 14, and/or the average rating of the respondent to the first part 14. These inquiries may be verified by comparing the answers to those inquiries to the actual number of sections 18 to the first part 12, the actual number of statements 36 in the first part 12, the actual number of minutes it took the respondent to complete the first part 14, and the actual average rating of respondent to the first part 14.

At step 106, the first set of responses may be compared to standardized responses of a business or any division of a business or other organization. In one embodiment, the standardized responses may be a company average of previous responses.

Next, at step 108, behaviorial domains and characteristics in which the responses of the target were non-standard may be identified. In one embodiment, the non-standard domains and characteristics are those in which the difference between a target manager's score and the standardized responses is statistically significant. A difference may be statistically significant where the respondent average is one standard deviation or more above or below the company average.

One standard deviation or more above the company average places the target's performance in the top seventy-fifth percentile or above, meaning that seventy-five percent of all other assessed managers have scored below that of the target manager. In such case, the characteristic or behaviourial domain may be considered, with considerable confidence, to be a relative strength of the target.

One standard deviation or more below the company average places the targets performance in the bottom twenty-fifth percentile or below, meaning that seventy-five percent of all other assessed targets have scored above that of the target manager. In such a case, the behaviourial domain or characteristic of the target manager can, with considerable confidence, be considered a relative weakness.

Figure 4A:
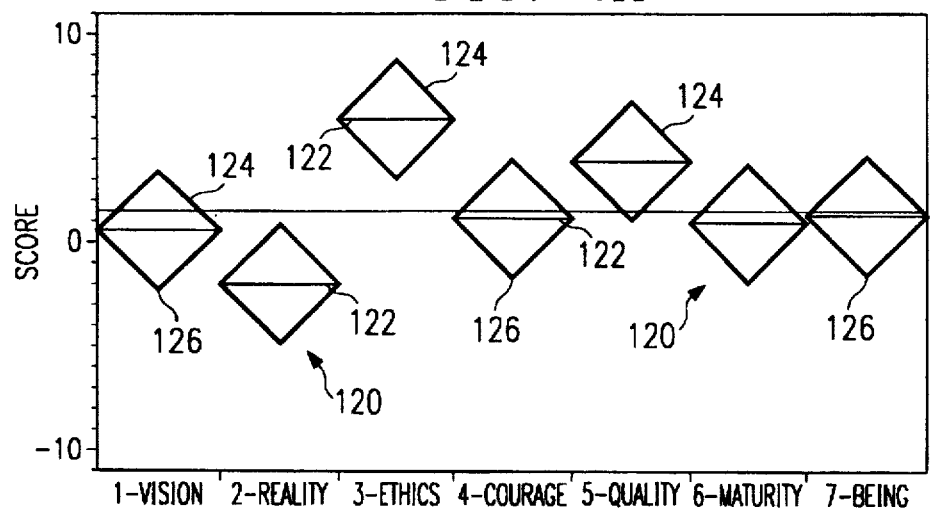
FIGS. 4A–D are face views illustrating an output report generated by the computer system of FIG. 2.

The results from the process may be printed in the form of the output report 90. In one embodiment, the output report 90 may include a summary for each section 18 representing a behaviourial domain and for each statement 36 representing a characteristic. FIG. 4A shows a summary for the behaviourial domains. An average of the responses for each domain is graphically represented by a diamond 120. The midpoint 122 of each diamond 120 represents the actual average response. An upper point 124 represents one standard deviation above the midpoint 122. Similarly, a lower point 126 of each diamond 120 represents one standard deviation below the midpoint 122.

Figure 4B:
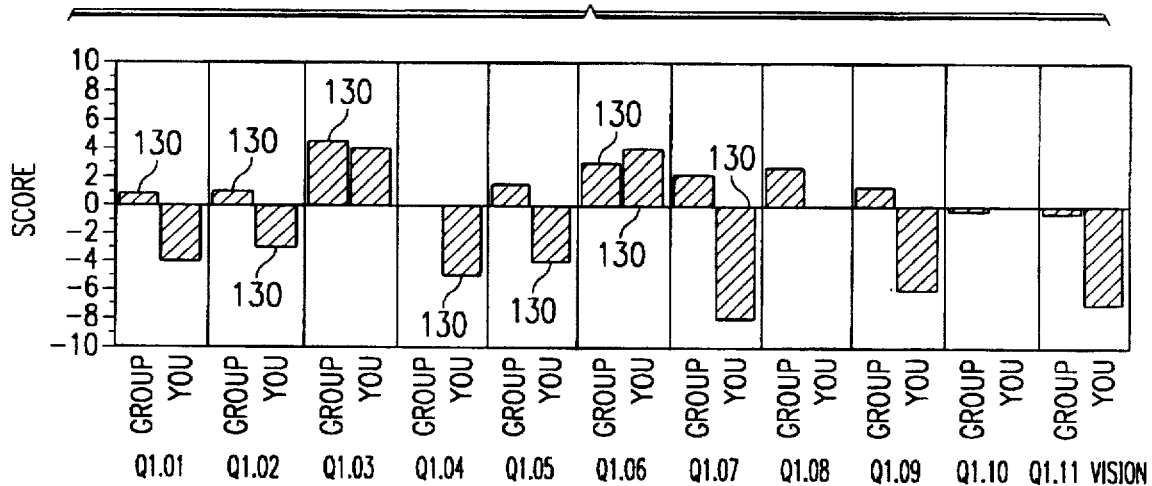

FIG. 4B shows the response and the standard (group) for each statement 36 of a section 18. As shown by FIG. 4B, the responses of the target and the standard may be graphically displayed by bar graphs 130.

Figure 4C:
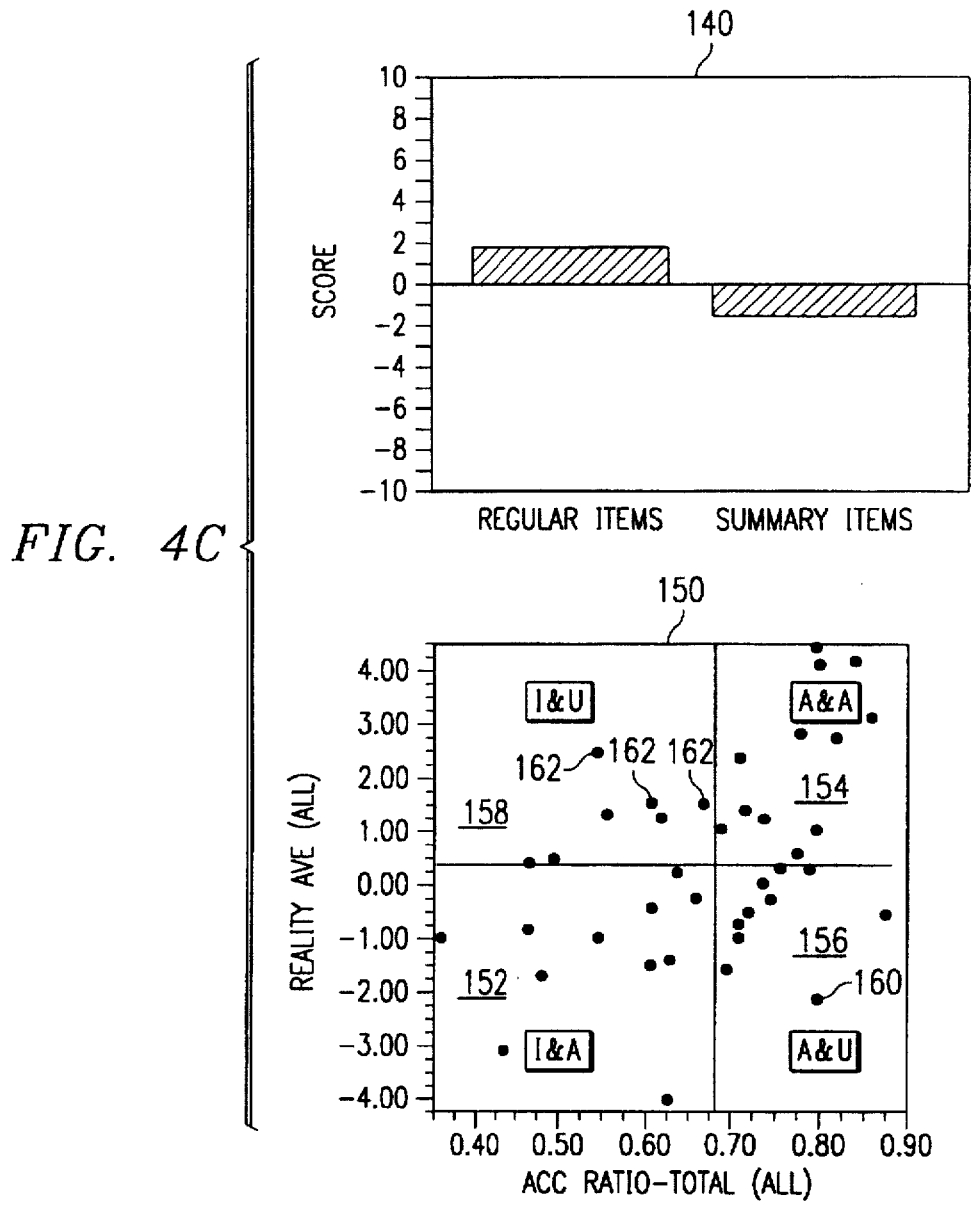

The reliability of the target manager's responses may also be graphically displayed. FIG. 4C shows a reliability plot 140. The average response to regular items, or non-summary statements 36, may be graphed against the average response to summary items, or summary statements 45. Disparity between the score for the regular items and the score for the summary items suggests that when called upon to furnish a global assessment of his or her own effectiveness, the target manager tends to be either more or less favorable than is justified.

Additionally, the validity of the target manager's responses may be graphically displayed. As shown by FIG. 4C, an actual versus perceived graph 150 may be generated. The graph 150 includes an inaccurate and aware quadrant 152, an accurate and aware quadrant 154, an accurate and unaware quadrant 156, and an accurate and unaware quadrant 158. The target manager's validity point 160 is plotted on the graph 150 against the validity points of other respondents 162. The target manager's responses are deemed accurate where his or her responses to the inquiries 52 of the validation section 50 are accurate. Conversely, a target manager's responses are deemed inaccurate where his or her responses to the inquiries 52 of the validation section 50 are inaccurate. A target manager's awareness of his or her accuracy or inaccuracy is determined by the responses to the realistic section 20. For example, as shown by the graph 150, where the responses to the validity section 50 are accurate but the target manager responded in the realistic section 20 that he or she was unrealistic, the validity point would reside in the accurate and unaware quadrant 156. The conjunction of these two scores suggests that the target's ability to estimate quantity and duration tends to be substantially above average and that he or she is unaware of that advantage.

Figure 4D:
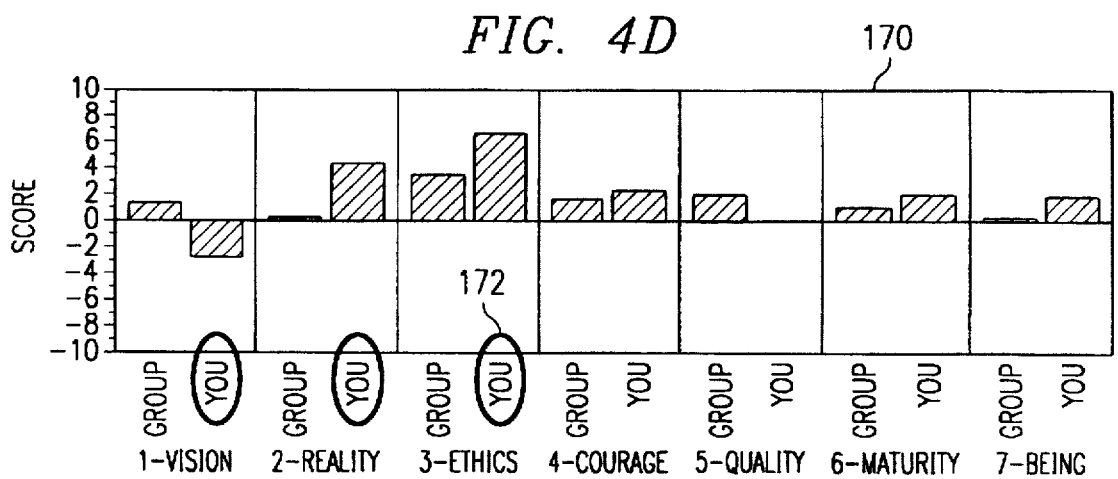

FIG. 4D shows an overall summary plot 170. In the summary plot 170, the average score of the target manager for each section 18 may be graphically displayed against the average score of the standardized responses for those sections. Additionally, behaviourial domains in which the target manager scored significantly different from the standardized responses may be indicated by an oval 172.

From the foregoing description of the present invention, other alternative constructions may suggest themselves to those skilled in the art. Therefore, the skill for the present invention is to be limited only by the claims below and the equivalents thereof.

What is claimed is:

1. An assessment tool for measuring effectiveness of a target, comprising:
   a first part having a plurality of independently movable objects each displaying a statement directed toward a characteristic of said target, the characteristic related to said target's effectiveness; and
   a second part associated with the first part having at least one inquiry directed toward verifiable performance of said target.

2. The assessment tool of claim 1, wherein the second part further comprises an inquiry directed toward verifiable performance of said target in completing the first part of said assessment tool.

3. The assessment tool of claim 1, wherein the second part further comprises an inquiry directed toward immediate verifiable performance of said target in completing the first part of said assessment tool.

4. The assessment tool of claim 1, wherein the first part further comprises a response scale for rating each statement.

5. The assessment tool of claim 4, wherein the response scale includes:
   an upper pole assigned to a most favorable characteristic of said target;
   a lower pole assigned to a least favorable characteristic of said target; and
   intermediate options assigned to remaining characteristic of said target.

6. The assessment tool of claim 5, wherein the upper pole is the numeral 10 and the lower pole is the numeral negative 10.

7. The assessment tool of claim 5, wherein the response scale further comprises a neutral option.

8. The assessment tool of claim 1, wherein the objects comprise cards.

9. The assessment tool of claim 1, wherein the objects comprise independently maneuverable electronic images of a display.

10. The assessment tool of claim 1, wherein the first part further comprises:

a plurality of sections directed toward different domains; and each section including at least one of said independently movable objects displaying a statement directed toward a characteristic of said target relevant to the domain.

11. The assessment tool of claim 10, wherein each object further comprises an element identifying the section to which the object belongs.

12. The assessment tool of claim 11, wherein the element comprises a numeral.

13. The assessment tool of claim 10, wherein each object of a section further comprises a sequence element identifying the sequence of the object in the section.

14. The assessment tool of claim 13, wherein the sequence element comprises a numeral.

15. The assessment tool of claim 11, wherein each section includes an object displaying a statement summarizing the characteristics of said target relevant to the domain.

16. A leadership assessment tool for measuring effectiveness of a manager, the tool comprising:

a plurality of independently movable objects, each object having a statement directed towards a leadership characteristic of the manager;

an inquiry directed towards verifiable performance of the manager; and a response scale for rating each statement.

17. A leadership assessment tool according to claim 16 wherein each leadership characteristic is in accordance with one of plural behavior domains, the tool further comprising a plurality of sections, each section directed toward a different behavior domain, each section having at least one said statement of one object directed toward a characteristic of the manager relevant to the domain.

18. The tool according to claim 17 wherein the response scale comprises:

an upper pole assigned to a most favorable characteristic of the manager; and a lower pole assigned to a least favorable characteristic of the manager.

19. The tool according to claim 18, wherein the response scale further comprises a neutral option.

20. The tool according to claim 19 wherein each object comprises a card.

* * * * *